United States Patent [19]
Profiri et al.

[11] Patent Number: 5,508,475
[45] Date of Patent: Apr. 16, 1996

[54] TERMINATION APPARATUS FOR CONDUIT, CABLE, AND BRAIDED BUNDLE

[75] Inventors: Stanley J. Profiri, Dunlap; Michael D. Williams, Peoria, both of Ill.

[73] Assignee: Transtechnology Corporation, Peoria, Ill.

[21] Appl. No.: 293,646

[22] Filed: Aug. 22, 1994

[51] Int. Cl.⁶ .................................................. H02G 15/02
[52] U.S. Cl. .............. 174/74 R; 174/19; 174/75 C; 174/88 C; 174/89; 439/98; 439/610
[58] Field of Search ............................ 174/74 R, 74 A, 174/19, 20, 60, 70 R, 88 C, 75 C, 89; 439/610, 98, 583

[56] References Cited

U.S. PATENT DOCUMENTS

| | | | |
|---|---|---|---|
| 2,673,233 | 3/1954 | Salisbury | 174/88 C |
| 3,551,882 | 12/1970 | O'Keere | 174/75 C |
| 3,710,006 | 1/1973 | French | 174/75 C |
| 4,156,554 | 5/1979 | Aujila | 174/89 |
| 4,444,453 | 4/1984 | Kirby et al. | 439/583 |
| 5,083,943 | 1/1992 | Tarrant | 439/583 |
| 5,295,868 | 3/1994 | Viad et al. | 174/74 R |
| 5,401,177 | 3/1995 | Dutton et al. | 439/98 |

Primary Examiner—Morris H. Nimmo
Attorney, Agent, or Firm—Roper & Quigg

[57] ABSTRACT

This invention involves an apparatus for terminating conduit, cable, and braided bundle in which the termination is accomplished with an interference fit between a collar and an end fitting. Once assembled, the conduit, cable, or braided bundle is compressed between the collar and the end fitting such that the final assembly can withstand the required level of axial and transverse force for the application, but not so much that the conduit, cable, or braided bundle loses its structural integrity.

35 Claims, 4 Drawing Sheets

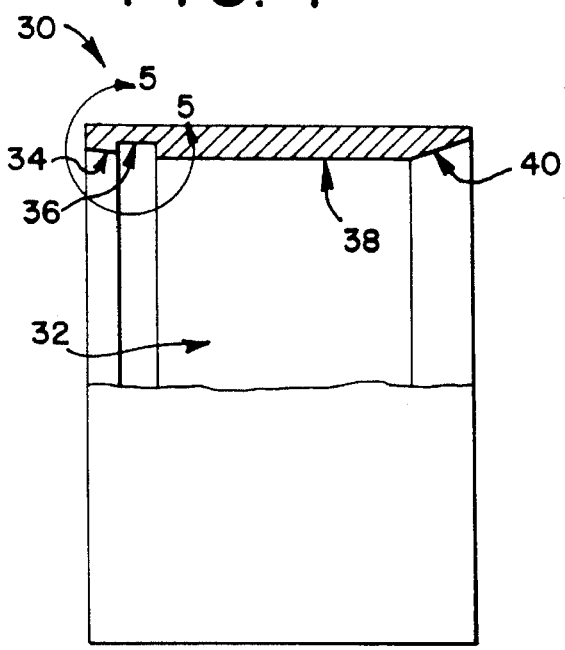
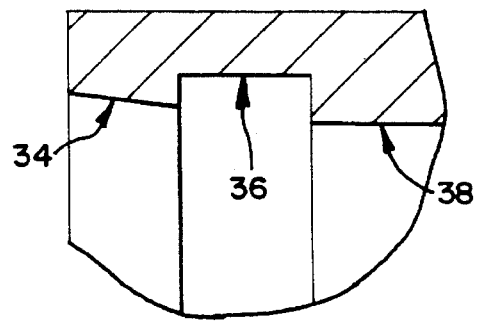
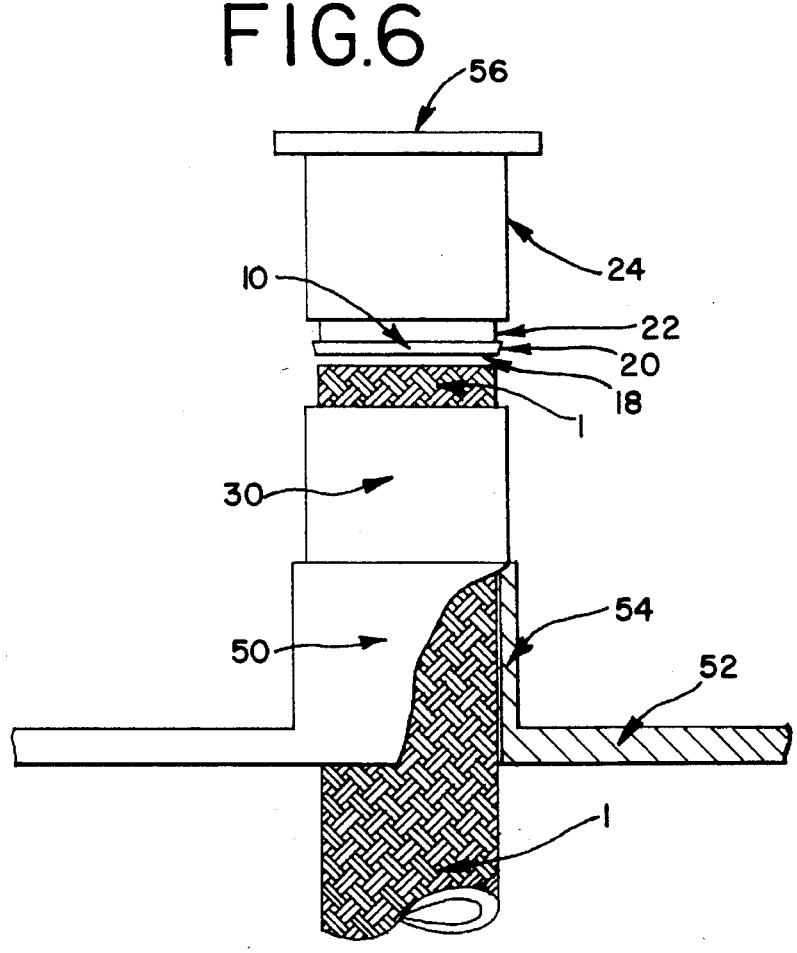

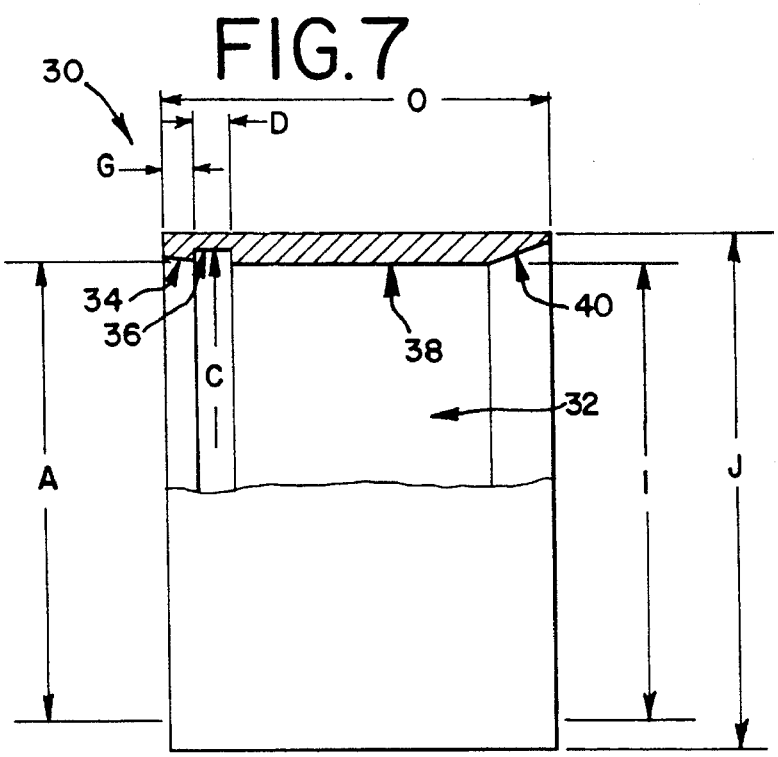
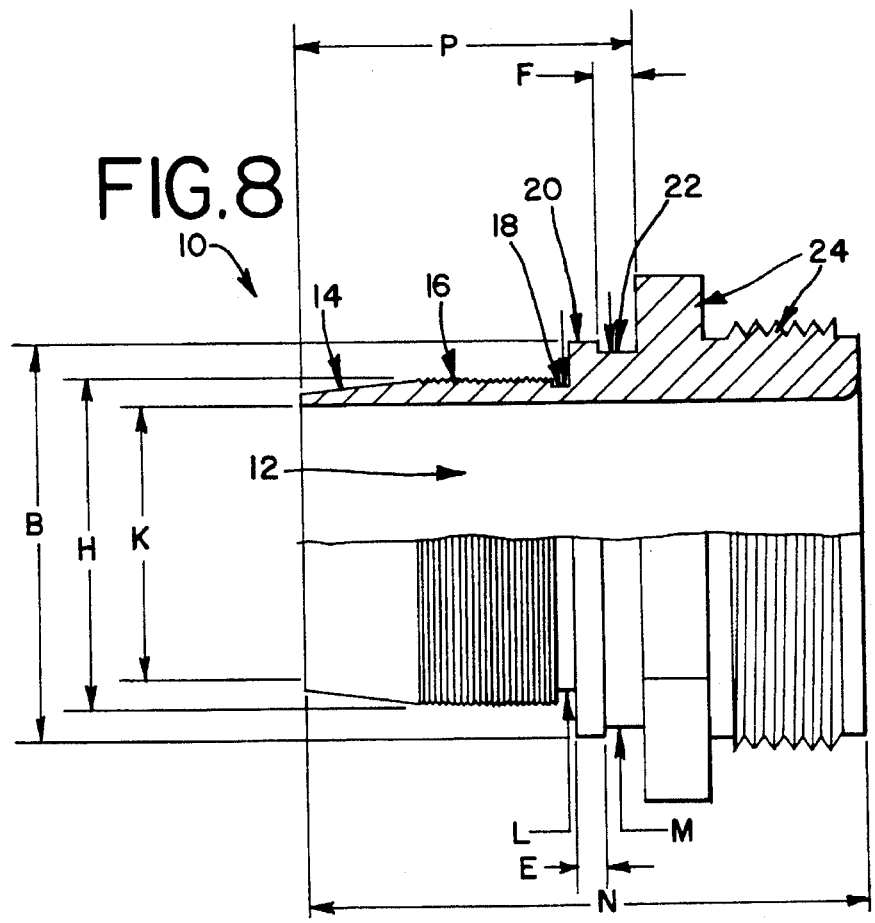

TERMINATION APPARATUS FOR CONDUIT, CABLE, AND BRAIDED BUNDLE

BACKGROUND OF THE INVENTION

The present invention relates to a termination method and apparatus for cables and conduits. The invention is especially concerned with such termination methods for use with conduit, braided bundle, or cable (unless specified, referred to collectively herein as "conduit"). The conduit is used, inter alia: (1) to provide electromagnetic shielding for any number of electrical circuits, (2) to provide structural protection to the wires, and (3) in some cases, to provide environmental protection to the wires.

The termination end fitting connects the conduit to end unit hardware. Prior art end fittings typically consist of a ferrule that can be integrally or otherwise attached to any number of different types of hardware configurations depending on the application. The termination is achieved by inserting the ferrule portion of the end fitting into the end of the conduit then securing, by a number of different methods, a clamp or collar around the outside of the conduit to secure the conduit to the end fitting.

The prior art termination me%hods ordinarily secure the conduit between the collar and end fitting by soldering, brazing, crimping, or swaging. However, the termination methods of the prior art are quite labor intensive, and may have other disadvantages as well.

For example, soldering involves many steps that take up to 20 minutes or more to complete per end fitting. If a type of conduit with a braided sheath is terminated by the soldering method, the braided sheath must be prepared to prevent any fraying. Then the collar and end fitting are soldered to the conduit. Preparing the final assembly typically involves tamping, grinding, reaming, and finally cleaning. This method often requires special chemicals and a heat source and is therefore very difficult to assemble in the field.

Crimping, in which a collar is physically compressed around the conduit, requires special tooling to support the inner diameter of the ferrule to prevent it from collapsing. This termination method may also take up to 20 minutes or more to complete per end fitting. The other methods of termination are similarly time-consuming and complex.

Some termination methods, such as soldering create internal sharp edges that can damage electrical conductors. Methods which produce external sharp edges, such as clamps, are also disfavored by end users due to their potential to cause damage, either to the conduit itself or to the surrounding environment. It is also preferable for the termination method to provide 360° of mechanical and electrical contact in order to retard electromagnetic interference, and to enhance the structural integrity of the connection.

SUMMARY OF THE INVENTION

The present invention overcomes the above shortcomings and provides an improved termination for conduit. The present invention involves a mechanical interference fit between the conduit, an end fitting, and a collar.

The collar in accordance with the present invention is an open-ended hollow cylindrical body with a lip and a groove around the circumference of the inner surface near one end of the collar.

The end fitting in accordance with the present invention is an open-ended, hollow cylindrical body with a flange around the circumference of its outer surface. The width and the outer diameter of the flange is less than or equal to than the width and the inner diameter of the groove on the collar such that the flange will fit snugly within the groove when the collar and end fitting are assembled.

Thus to complete the termination, preferably, the collar is placed over the end of the conduit to be terminated, the end of the conduit is expanded, the end fitting is inserted into the end of the conduit such that the flange remains just outside of the conduit, then the lip of the collar is forced over the flange of the end fitting such that the flange is forced into the groove on the collar thereby securing the collar and the end fitting together in a mechanical interference fit and compressing the conduit between the collar and the end fitting.

The conduit must be sufficiently compressed between the collar and the end fitting in order to achieve an adequate tensile strength so that the final assembly can withstand the required level of axial and transverse force for the application. However, the conduit cannot be so compressed therebetween such that it loses its structural integrity. The inner diameter of the collar and the outer diameter of the portion of the end fitting within the conduit should therefore be designed to provide the necessary level of compression of the conduit. The assembly can be accomplished with tooling commonly found at many work sites, such as an arbor press and a hydraulic crimp machine.

Accordingly it is an object of this invention to provide a termination method and apparatus for conduit and cable which does not require special chemicals or a heat source.

Another object is to provide a termination method and apparatus for Conduit, braided bundle, and cable which is economical and minimizes the amount of labor in assembly.

A further object is to provide a termination method and apparatus which can be accomplished by the end user in the field with tooling commonly found at many work sites.

It is another object of this invention to provide a termination method and apparatus which has substantially 360° of mechanical and electrical contact between the collar and the end fitting.

Additional objects, advantages, and novel features of the invention will be set forth as part of the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The objects and advantages of this invention will become more apparent from reading the following detailed description in conjunction with he accompanying drawings in which:

FIG. 4 is a partial cutaway side view of a collar according to the present invention.

FIG. 5 is a fragmentary enlarged view of the lip and groove shown in FIG. 4 taken around line Z—Z.

FIG. 6 is a partial cutaway side view of the present invention in a semi-assembled form and a fixture useful in assembling the present invention.

FIG. 7 is a partial cutaway side view of a collar illustrating several of the dimensions shown in TABLE 1.

FIG. 8 is a partial cutaway side view of an end fitting illustrating several of the dimensions shown in TABLE 1.

Common elements between the drawings are designated by the same numeral.

DESCRIPTION OF THE PREFERRED EMBODIMENT

Figure 1:
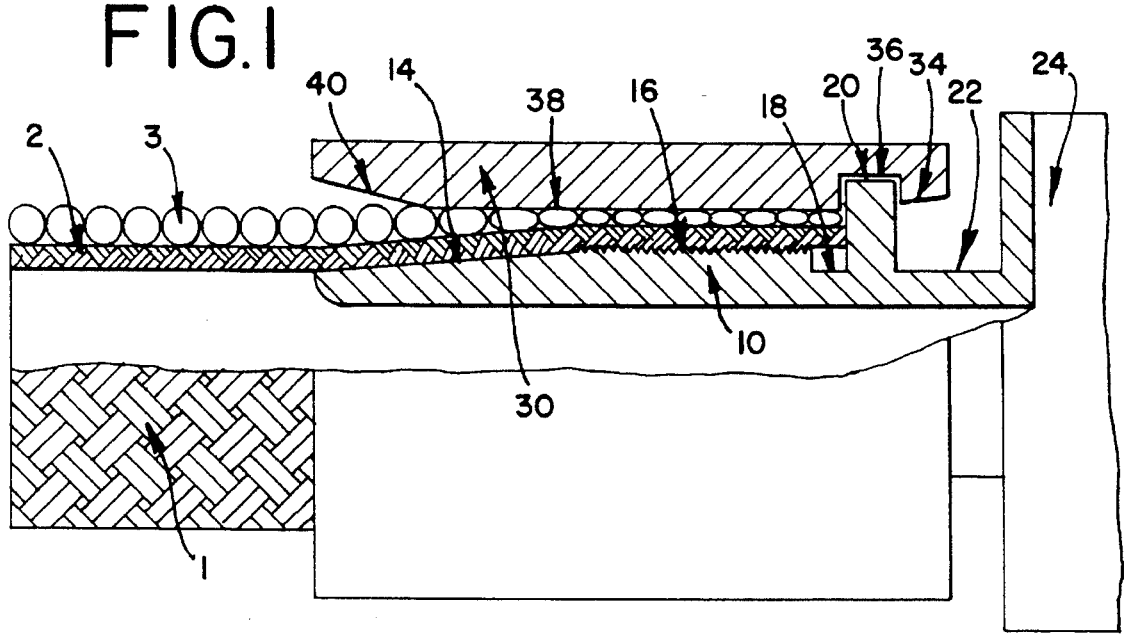
FIG. 1 is a partial cutaway side view of the present invention in its assembled form.

Referring now to the Figures, and in particular to FIG. 1, there is shown a termination apparatus embodying the present invention for terminating a conduit, braided bundle or cable. The conduit shown in FIG. I is conduit 1 which consists of flexible corrugated or convoluted tubing 2 that is further reinforced by a braided sheath 3. In the manner of the invention, the termination apparatus comprises a end fitting 10 and a collar 30.

Figure 2:
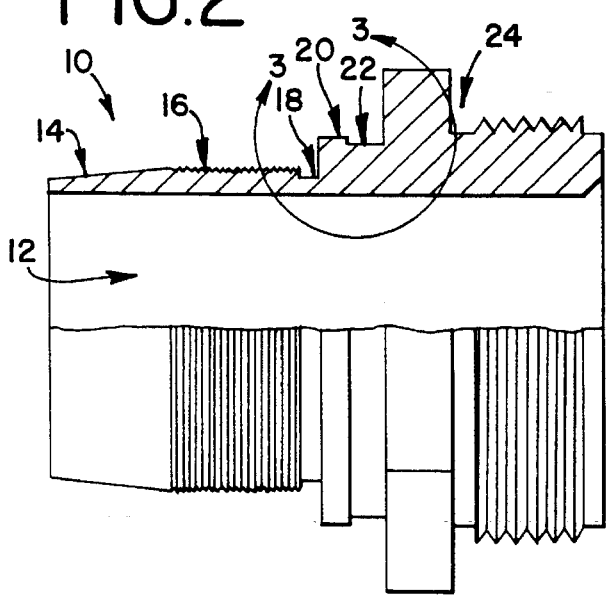
FIG. 2 is a partial cutaway side view of one embodiment of an end fitting according to the present invention.

As shown in both FIG. I and, in more detail, in FIG. 2, the internal surface of the end fitting 10 is a smooth axial bore 12 of generally constant diameter extending to the hardware region, and perhaps beyond depending upon the nature of the hardware to be attached. The external surface of the preferred embodiment of the end fitting 10 has six portions: a tapered region 14, a friction region 16 (together, the compression support region), a relief channel 18, a flange 20, a securing channel 22, and a hardware portion 24. The tapered region 14 is preferably a smooth surface that preferably tapers such that the portion more distant from the friction region 16 has a smaller outer diameter than the portion closer to the friction region 16, preferably at an angle of approximately 5 degrees with respect to the axis of the conduit 1. The friction region 16 is an annular surface which preferably has a relatively large coefficient of friction consisting of, for example, a surface with annular grooves, knurling, or other friction creating elements. The relief channel 18 is an annular channel with a smaller outer diameter than the friction region 16, the flange 20 and the securing channel 22. The flange 20 is an annular ring-shaped projection with a larger outer diameter than the friction region 16, the relief channel 18, and the securing channel 22, that preferably tapers such that the portion nearer the relief channel 18 has a smaller outer diameter than the portion closer to the securing channel 22, preferably at an angle of approximately 5 degrees with respect to the axis of the end fitting 10.

Figure 9:
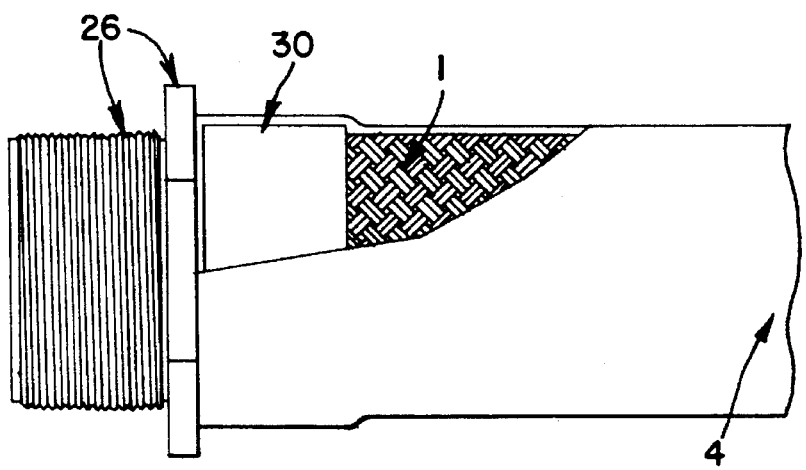
FIG. 9 is a side view of an embodiment of the present invention in its assembled form having a jacket, the jacket shown in a partial cutaway view.
Figure 10:
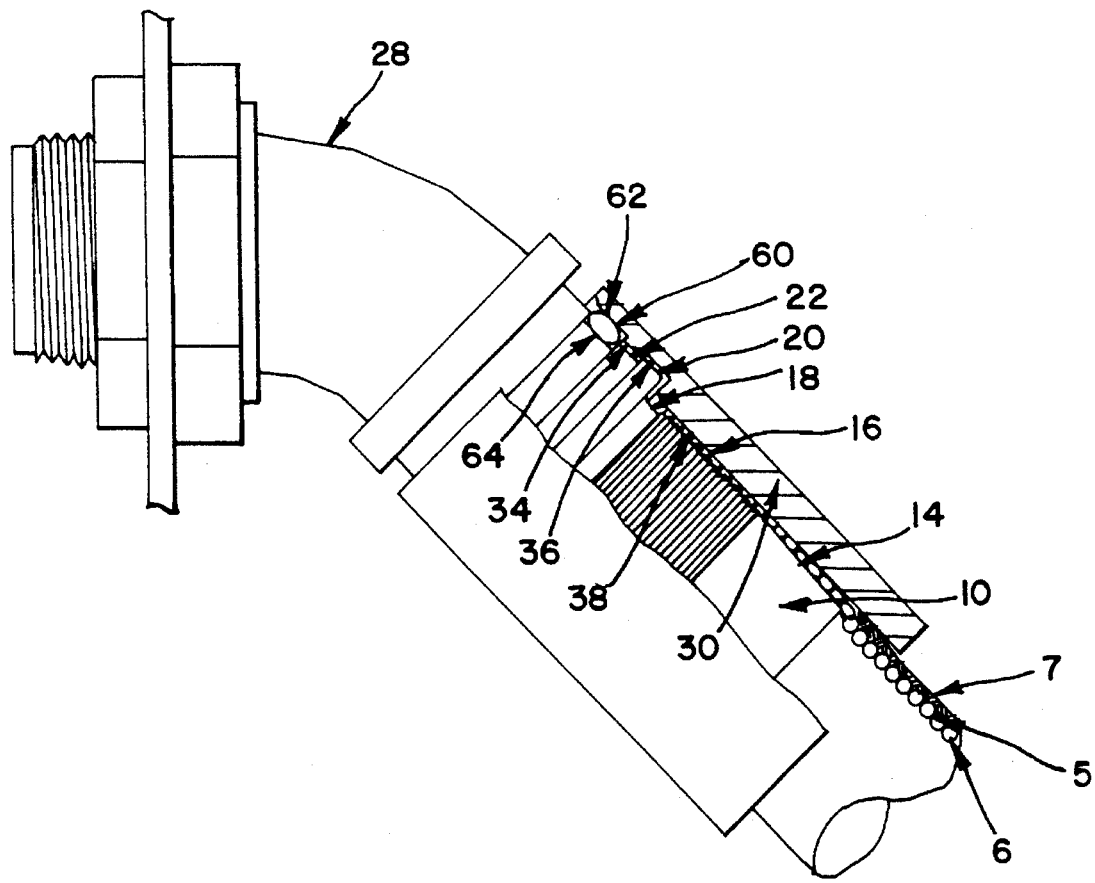
FIG. 10 is a partial cutaway side view of an embodiment of the present invention in its assembled form illustrating a hermetically sealed termination of a cable.

The securing channel 22 is an annular channel with an outer diameter smaller than the outer diameter of the flange 20, greater than or equal to the outer diameter of the friction region 16, and greater than the outer diameter of the relief channel 18. The hardware portion 24 can comprise any of a number of different types of hardware configurations that are used in the art depending on the desired application including backshell, elbow, transition, adaptor, box connector, J-box, or bulkhead fittings. Two of these hardware configurations, a box connector 26 and an elbow box connector as are shown in FIGS. 9 and 10 respectively.

Figure 3:
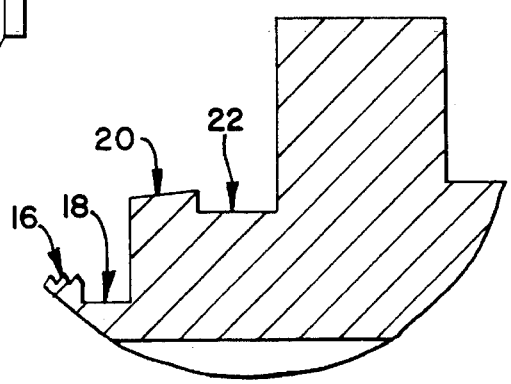
FIG. 3 is a fragmentary enlarged view of the flange shown in FIG. 2 taken around line Y—Y.

FIG. 3 is an enlarged view of the end fitting 10 showing the relief channel 18, the flange 20, and the securing channel 22 in greater detail.

As shown in both FIG. 1 and, in more detail, in FIG. 4, the external surface of the collar 30 preferably is a cylinder of generally constant outer diameter. The collar 30 has an axial bore 32 of variable diameter extending completely therethrough, the internal surface of which preferably has four portions: a lip 34, a groove 36, an interior compression surface 38, and a beveled end 40. The lip 34 is a smooth annular lip that preferably tapers away from the groove 36 at an angle of approximately 5 degrees with respect to the axis of the collar 30. The groove 36 is a smooth annular channel the inner diameter of which is greater than the inner diameter of the lip 34 or the interior compression surface 35. The interior compression surface 38 is preferably a smooth cylindrical surface, the inner diameter of which is less than or equal to the inner diameter of the lip 34, and less than the inner diameter of the groove 36. The beveled end 40 is a smooth surface that preferably tapers away from the interior compression surface 38 at an angle of approximately 20 degrees with respect to the axis of the collar 30. All inner surfaces of the collar 30 are preferably smooth to facilitate assembly. FIG. 5 is an enlarged view of the collar 30 showing the lip 34, the groove 36, and the interior compression surface 38 in greater detail.

Terminating conduit in accordance with the present invention preferably involves the following four steps. Reference is made to conduit 1 for exemplary purposes only. First, the collar 30 is placed over the end of the conduit 1 so that the end of the collar 30 with the lip 34 is closest to the end of the conduit 1 that is to be terminated and the collar is positioned far enough from the end of the conduit 1 to permit the following step. Second, the end of the conduit 1 to be terminated is expanded, for example, by hydraulic jaws or an expandable collet on a lathe, thereby increasing the diameter of that portion of the conduit 1. Third, the end fitting 10 preferably is inserted into the expanded end of the conduit 1 such that the flange 20 remains just outside of the conduit 1. Fourth, sufficient force is applied to the collar 30, with an ordinary tool such as an arbor press, to force the collar 30 over the expanded portion of the conduit 1 and to force the lip 34 on the collar 30 over the flange 20 on the end fitting 10 such that the flange 20 is forced into the groove 36 of the collar 30 and the lip 34 comes to rest in the securing channel 22 on the end fitting 10 thereby securing the collar 30 to the end fitting 10 with a mechanical interference fit and compressing the conduit 1 between the interior compression surface 38 of the collar 30 and the friction region 16 of the end fitting 10.

If an actual conduit consisting of tubing 2 and the braided sheath 3, is being terminated, then during step 4, when the collar 30 is forced over the end fitting 10, the tubing 2 and the braided sheath 3 expand in length as they are compressed between the collar 30 and the end fitting 10. The wires from the braided sheath 3 are forced over the flange 20 and sheared off by the lip 34 during assembly. Because the end of the braided sheath 3 is sheared away during assembly, no pre-assembly preparation of the braided sheath 3 is required to prevent fraying as is required with other termination methods. The tubing 2, as it expands, strikes the edge of the flange 20 and is forced downward into the relief channel 18.

FIG. 6 depicts a fixture that can be used to accomplish step 4. FIG. 6 depicts the present invention in a semi-assembled form, after steps 1, 2 and 3 have been accomplished: the collar 30 was placed over the conduit 1, the end of the conduit to be terminated was expanded, and the end fitting 10 was placed within the enlarged portion of the conduit 1 such that such that the flange 20 remained just outside of the conduit 1. As seen in FIG. 6., the hardware portion 24, the securing channel 22, the flange 20; and a portion of the relief channel 18, all remain outside the conduit 1 at this stage of assembly.

A fixture 50 which consists of a base support region 52, and a side support region 54 is used to facilitate step 4. The base support region 52 preferably consists of a flat plate-like structure that can be rested upon the table portion of the tool that will apply the force, such as an arbor press, with a hole where the base support region 52 is integrally connected to the side support region 54. The side support region 54 is preferably an open-ended hollow structure of the same general shape as the conduit 1 being terminated, with an inner diameter slightly larger than the outer diameter of the conduit 1 and an outer diameter that is greater than the inner diameter of the collar 30 and preferably greater than or equal to the outer diameter of the collar 30. The end of the side support region 54 that is distal to the base support region 52 will contact and support the collar 30 during step 4.

Thus, in order to complete step 4, the conduit 1 is placed within the fixture 50 such that the collar 10 rests against the side support region 54 of the fixture 50 and the end fitting extends above the fixture 50. During step 4, the fixture 50 will keep the collar 30 stationary. force 56 is then applied, for example, in the direction indicated in FIG. 6, which forces the end fitting 10 and the collar 30 together, to accomplish step 4. Alternatively, a force could be applied to the collar 30 in the opposite direction while the end fitting 10 is kept stationary.

Several dimensions are important to the invention. These dimensions are depicted in FIGS. 7 and 8. FIG. 7 is a duplicate of FIG. 4, a partial cutaway side view of the collar 30, to which the important dimensions have been added. FIG. 5 is a duplicate of FIG. 2, a partial cutaway side view of the end fitting 10, to which the important dimensions have been added.

Dimension A, the smallest inner diameter of the lip 34, must be smaller than dimension the largest outer diameter of the flange 20, so that once the lip 34 is forced over the flange 20 the lip 34 cannot be easily forced back over the flange 20 and the collar 30 is thereby adequately secured to the end fitting 10.

Dimension C, the inner diameter of the groove 36 on the collar 30, should be slightly greater than or equal to dimension B, the largest outer diameter of the flange 20. Dimension D, the width of the groove 36, should be slightly greater than or equal to dimension E, the width of the flange 20. Thus, when the collar 30 is assembled to the end fitting 10, the flange 20 should just fit within the groove 36.

Dimension F, the width of the securing channel 22 on the end fitting 10, should at least be slightly larger than dimension G, the width of lip 34 on the collar 30, and, preferably, when the invention is used to terminate conduit 1 which consists of tubing 2 covered with a braided sheath 3, dimension F, the width of the securing channel 22, should be approximately three times the thickness of the braided sheath 3 plus dimension G, the width of the lip 34. This excess space is necessary to allow the wires from the braided sheath 3, which are forced over the flange 20 and sheared off by the lip 34 during assembly, to be more easily cleared out of the securing channel 22.

Another important dimension is the difference between dimension H, the outer diameter of the friction region 16 on the end fitting 10, and dimension I, the inner diameter of the interior compression surface 38 on the collar 30. This distance between the friction region 16 and the interior compression surface 38 defines the level of compression that the conduit will experience after assembly. This compression, along with the frictional force provided by the friction region 16, and the structural strength of the materials as assembled, determines the tensile strength of the assembly. The difference between dimension H, the outer diameter of the friction region 16, and dimension I, the inner diameter of the interior compression surface 38, will vary depending upon the size and type of conduit being used as well as the axial and transverse force requirements of the application. However, in any event, dimension H, the outer diameter of the friction region 16, when added to twice the original thickness of the conduit wall in the uncompressed and unexpanded state, must be greater than dimension I, the inner diameter of the interior compression surface 38, in order to achieve compression of the conduit.

The collar 30 must be thick and strong enough so that when the collar 30 is forced over the expanded portion of the conduit the collar 30 does not unacceptably expand, distort or fracture. Rather, the conduit should be compressed by the collar 30. The thickness of the collar 30 is the difference between dimension I, the inner diameter of the interior compression surface 38, and dimension J, the outer diameter of the collar 30. Similarly, the end fitting 10 must be thick and strong enough so that the end fitting 10 is not unacceptably compressed, distorted or fractured when the collar 30 is forced over the conduit. The thickness of the end fitting 10 is the difference between dimension H, the outer diameter of the friction region 16, and dimension K, the inner diameter of the end fitting 10. The thickness of the collar 30 and the end fitting 10 will vary depending on the type of material used and the type of conduit being compressed.

TABLE 1 shows an example of the values for the important dimensions for an end fitting and a collar of the preferred type discussed above. The collar and the end fitting used for this example are both made of aluminum, and are designed to terminate aluminum conduit with an 0.830 inch inner diameter and an 1.040 inch outer diameter, consisting of, aluminum convoluted tubing covered with aluminum braided sheath. TABLE 1 also includes values for other dimensions besides the important dimensions discussed above including=dimension L, the outer diameter of the relief channel 18, dimension M, the outer diameter of the securing channel 22, dimension N, the length of the end fitting 10, dimension 0, the length of the collar 30, and dimension P, the length of the end fitting 10 without the hardware portion 24. FIGS. 7 and 8 are figures illustrating the various dimensions of the collar 30 and the end fitting 10 respectively.

TABLE 1

| Dimension | (inches) |
| --- | --- |
| A | 1.055 |
| B | 1.075 |
| C | 1.095 |
| D | 0.090 |
| E | 0.075 |
| F | 0.120 |
| G | 0.075 |
| H | 0.896 |
| I | 1.0325 |

TABLE 1-continued

| Dimension | (inches) |
| --- | --- |
| J | 1.180 |
| K | 0.750 |
| L | 0.836 |
| M | 1.030 |
| N | 1.590 |
| O | 0.930 |
| P | 0.970 |

The present invention can be used in applications requiring a jacket to be placed over the final terminated conduit assembly to provide further environmental protection. FIG. 9 shows a side view of a completed terminated conduit assembly with a jacket, the jacket portion shown in partial cutaway. As shown in FIG. 9, the jacket 4 is preferably assembled over almost the entire portion of the assembly including the conduit 1 and the collar 30. The hardware portion 24 of the end fitting 10 is the only portion of the assembly which remains uncovered by the jacket 4.

In order to assemble a terminated conduit assembly with a jacket, the four steps of assembly are performed in the same manner as discussed above, with the addition of two steps. First, before step 1 discussed above is accomplished, the jacket 4 is installed over the conduit 1 and rolled back away from the end of the conduit 1 that will be terminated. Then steps 1 through 4 are performed as discussed above. As a final additional step, the jacket 4 is unrolled over the conduit 1 and the assembled collar 30 and preferably affixed to the collar with, preferably, a water-proof adhesive that will provide a tight seal.

The present invention can be further be adapted, as shown in FIG. 10, to terminate, for example, a cable 5 in a manner that hermetically seals the terminated assembly. A cable 5 consists of a cable braid 6 covered by a cable jacket 7. To accomplish a hermetic seal at the end of assembly distal to the cable 5, the securing channel 22 is modified to include an O-ring groove 64 that has an outer diameter that is smaller than the outer diameter of the securing channel 22 to permit an O-ring 60, a ring-shaped structure made from an elastomer, to be placed securely in the O-ring groove 64.

The collar 30 is modified to include an O-ring region 62, a cylindrical surface which extends from the lip 34. The inner diameter of the O-ring region 62 can be greater than or equal to the inner diameter of the lip 34. The difference between the inner diameter of the Oring region 62 and the outer diameter of the Oring groove 64 should be less than the thickness of the O-ring 60 so that the O-ring makes a tight hermetic seal between the collar 30 and the end fitting 10 when assembled.

To achieve a hermetic seal where the collar 30 and the cable 5 meet, the interior compression surface 38 extends to the end of the collar 30, and the beveled end 40 may be eliminated from the collar 30. Further, the collar 30, when assembled to the end fitting 10, extends past the tapered region 14 of the end fitting 10. This permits the cable jacket 7 instead to be adhered to the portion of the collar 30 that extends past the tapered region 14 without being compressed between the friction region 16 and the interior compression surface 38. Rather, only the cable braid 6 is so compressed.

This hermetic assembly is accomplished by adding an additional step to the four step assembly process previously disclosed. Before step 4, an adhesive, preferably a water-proof adhesive that will provide a tight hermetic seal between the cable jacket 7 and the collar 30, is applied to the cable jacket 7 in the area which will contact the collar 30 once assembled. Then, when step 4 is completed, the cable jacket 7 will adhere to the collar 30 creating a hermetic seal.

With respect to other possible variations of the invention, the tapered region 14 on the end fitting 10 and the beveled end 40 on the collar 30 are not necessarily required to be tapered in order to practice the invention. These portions are tapered in order to facilitate the assembly process. The tapered region 14 is tapered to permit the end fitting 10 to be easily inserted into the conduit 1. The beveled end 40 is tapered to allow the collar 30 to more easily slide over the conduit 1. However, as discussed previously with respect to FIG. 10, it is preferable to eliminate the beveled end 40 if a cable jacket 7, or other similar jacket, will be adhered to the inside portion of the collar 30.

Similarly the lip 34 and the flange 20 are tapered in order to facilitate assembly. In the manner of the invention, the smallest inner diameter of the lip 34 must be smaller than the largest outer diameter of the flange 20 in order to provide sufficient means for securing the collar 30 to the end fitting 10. Because the lip 34 and the flange 20 are tapered, when the lip 34 and the flange 20 first make contact during assembly, the portion of the lip 34 with the largest inner diameter preferably meets and is approximately of equal diameter with the portion of the flange 20 with the smallest outer diameter. Thus, tapering the lip 34 and the flange 20 facilitates pushing the lip 34 over the flange 20.

The relief channel 18 is another feature that facilitates assembly of the present invention. During the assembly of, for example, actual conduit consisting of tubing 2 and the braided sheath 3 as shown in FIG. 1, the tubing 2 and the braided sheath 3 expand in length as they are compressed between the collar 30 and the end fitting 10. As stated above, the braided sheath 3 travels over the flange 20 and is sheared off by the lip 34. The tubing 2, as it expands, strikes the edge of the flange 20 and is forced downward. The relief channel 18 permits space for the tubing 2 in which to curl as it expands.

The collar 30 and the end fitting 10 can be made of a variety of materials such as aluminum, brass, stainless steel, or low carbon steel and can be finished in a variety of ways known to those skilled in the art. Preferably, the collar 10 and the end fitting 10 are made from the same material of the conduit in order to minimize the galvanic corrosion potential.

Some advantages of the present invention evident from the foregoing description include a method of terminating conduit, braided bundle and cable that provides a simple termination process. reducing the amount of labor and expense needed to terminate the conduit. The present invention retards interference by providing a good 360° mechanical and electrical contact between the conduit and the end fitting. Further, the smooth interior and exterior surfaces of the present invention reduce the potential for damage by or to the assembly.

Further, no heat source, special chemicals, or fixed tooling are required by the present invention. Thus, this termination method of the invention can be adapted for field use, giving end-users more flexibility in design. The end user will not necessarily have to commit the engineering time needed to determine the precise conduit lengths and end hardware needed before assembly. If the assembly is designed in advance and a design change occurs, the end user can simply disassemble the old conduit termination assembly and reassemble the new conduit and end fitting needed, rather than having to wait for the manufacturer to build and ship a new assembly or return the existing assemblies for modification.

The present invention provides an especially improved method to terminate teflon conduit. Presently, teflon is terminated ordinarily by crimping, which damages the braided sheath. The present invention provides a stronger and more efficient assembly for terminating teflon because it does not damage the braided sheath. For other types of conduit and cable, the present invention provides a termination assembly which is at least equal in strength to the termination assemblies provided by prior art termination methods.

What has been described is an improved method and apparatus for terminating conduit, braided bundle and cable. Though the embodiments disclosed herein are preferred, numerous changes and modifications which do not part from the true scope of the invention will become apparent to those skilled in the art. Accordingly, all such changes and modifications are intended to be covered by the following claims.

What is claimed is:

1. A conduit terminating apparatus comprising:
   a. An annular collar,
      (1) wherein said collar is open ended and defines an inner surface and an outer surface,
      (2) wherein said inner surface of said collar further defines an annular lip, an annular groove proximate to said lip, and an annular interior compression surface proximate to said annular groove,
      (3) wherein said collar is capable of being slid over the outer diameter of a conduit prior to assembling said conduit terminating apparatus,
      (4) wherein said lip has an inner diameter that is less than the inner diameter of said annular groove, and
      (5) wherein said annular groove has an inner diameter that is greater than the inner diameter of said annular compression surface;
   b. An end fitting,
      (1) wherein said end fitting is open ended and defines an inner surface and an outer surface;
      (2) wherein said outer surface of said end fitting defines an annular securing channel, an annular flange proximate to said securing channel, and an annular compression support region, and
      (3) wherein the outer diameter of said flange is greater than the outer diameter of said securing channel and said compression support region; and
   c. Wherein the relationship of the dimensions of said collar and said end fitting relative to each other and relative to the conduit is further defined as follows:
      (1) the outer diameter of said compression support region of said end fitting is less than the inner diameter of said interior compression surface of said collar, and the outer diameter of said compression support region of said end fitting added to twice the original thickness of the wall of the conduit is greater than the inner diameter of said interior compression surface of said collar,
      (2) the inner diameter of said lip of said collar is less than the outer diameter of said flange of said end fitting,
      (3) the inner diameter of said groove of said collar is greater than or equal to the outer diameter of said flange of said end fitting, and
      (4) wherein the outer diameter of said flange of said end fitting is greater than the inner diameter of said interior compression surface of said collar.

2. The conduit terminating apparatus of claim 1 wherein the inner diameter of all portions of said inner surface of said collar are greater than the outer diameter of the conduit.

3. The conduit terminating apparatus of claim 2 wherein said end fitting further defines a hardware region proximate to said annular securing channel.

4. The conduit terminating apparatus of claim 1 wherein said lip of said collar is tapered such that said lip has a lesser inner diameter proximate to said groove and a greater inner diameter at a location more remote from said groove.

5. The conduit terminating apparatus of claim 4 wherein said taper of said lip of said collar is substantially 5 degrees relative to the axis of the conduit.

6. The conduit terminating apparatus of claim 1 wherein said flange of said end fitting is tapered such that said flange has a lesser outer diameter proximate to said compression support region and a greater outer diameter proximate to said securing channel.

7. The conduit terminating apparatus of claim 6 wherein said taper of said flange of said end fitting is substantially 5 degrees relative to the axis of the conduit.

8. The conduit terminating apparatus of claim 1 wherein said end fitting further defines an annular clearance channel between the flange and the compression support region, wherein said clearance channel has an outer diameter that is less than the outer diameter of said flange and said compression support region.

9. The conduit terminating apparatus of claim 1 wherein at least a portion of the outer surface of said compression support region of said end fitting is tapered such that the portion of said compression support region proximate to said flange has a greater outer diameter than the portion of said compression support region more remote from said flange.

10. The conduit terminating apparatus of claim 9 wherein said taper of said compression support region is substantially 5 degrees relative to the axis of the conduit.

11. The conduit terminating apparatus of claim 1 wherein at least a portion of the outer surface of said compression support region of said end fitting further defines a friction surface.

12. The conduit terminating apparatus of claim 11 wherein said friction surface comprises annular grooves or knurling.

13. A conduit terminating apparatus comprising:
   a. An annular collar having an inner surface and an outer surface, with said inner surface having a lip, a groove, and an interior compression surface, and
   b. An end fitting having an inner surface and an outer surface, with said outer surface having a securing channel, a flange, and a compression support region; wherein, when assembled said interior compression surface of said collar and said compression support region of said end fitting are capable of compressing a conduit therebetween, and wherein said lip of said collar fits within said securing channel of said end fitting, and wherein said flange of said end fitting fits within said groove of said collar.

14. The conduit terminating apparatus of claim 13 wherein said end fitting fits inside of the interior wall of the conduit.

15. The conduit terminating apparatus of claim 13 wherein said end fitting further defines a hardware region proximate to said annular securing channel.

16. The conduit terminating apparatus of claim 13 wherein said lip of said collar is tapered such that said lip has a lesser inner diameter proximate to said groove and a greater inner diameter at a location more remote from said groove.

17. The conduit terminating apparatus of claim 16 wherein said flange of said end fitting is tapered such that said flange has a lesser outer diameter proximate to said compression support region and a greater outer diameter proximate to said securing channel.

18. The conduit terminating apparatus of claim 17 wherein said taper of said flange of said end fitting and said taper of said lip of said collar are substantially 5 degrees relative to the axis of the conduit.

19. The conduit terminating apparatus of claim 13 wherein the outer surface of said compression support region of said end fitting further defines a friction surface.

20. The conduit terminating apparatus of claim 19 wherein said friction surface comprises annular grooves or knurling.

21. A conduit termination assembly comprising:
  a. A conduit,
  b. An annular collar having an inner surface and an outer surface, said inner surface having a lip, a groove, and an interior compression surface, and
  c. An end fitting having an inner surface and an outer surface, said outer surface having a securing channel, a flange, and a compression support region; wherein said conduit is compressed between said interior compression surface of said collar and said compression support region of said end fitting, and wherein said lip of said collar fits within said securing channel of said end fitting, and wherein said flange of said end fitting fits within said groove of said collar.

22. The conduit termination assembly of claim 21 wherein said lip of said collar and the securing channel of said end fitting are annular.

23. The conduit termination assembly of claim 22 wherein said flange of said end fitting and said groove of said collar are annular.

24. The conduit termination assembly of claim 21 wherein the inner clearance of all portions of said inner surface of said collar are greater than the outer diameter of said conduit.

25. The conduit termination assembly of claim 21 wherein said end fitting further defines a hardware region.

26. The conduit termination assembly of claim 21 wherein the outer surface of said compression support region of said end fitting further defines a friction surface.

27. The conduit termination assembly of claim 26 wherein said friction surface comprises annular grooves or knurling.

28. The conduit termination assembly of claim 21 wherein the distance between the axis of said conduit and the innermost portion of said lip of said collar is less than the distance between the axis of said conduit and the outermost portion of said flange of said end fitting.

29. The conduit termination assembly of claim 28 wherein said lip of said collar and said flange of said end fitting are tapered relative to each other.

30. The conduit termination assembly of claim 29 wherein said lip of said collar and said flange of said end fitting are tapered at the same angle relative to each other.

31. A conduit termination assembly comprising:
  a. A conduit,
  b. An annular collar having an inner surface and an outer surface, said inner surface having a lip and an interior compression surface, and
  c. An end fitting having an inner surface and an outer surface, said outer surface having a flange and a compression support region; wherein said conduit is compressed between said interior compression surface of said collar and said compression support region of said end fitting, and said lip of said collar engages said flange of said end fitting in a mechanical interference fit, impeding the withdrawal of said end fitting from said collar.

32. The conduit termination assembly of claim 31 wherein the distance between the axis of said conduit and the innermost portion of the lip of said collar is less than the distance between the axis of said conduit and the outermost portion of said flange of said end fitting.

33. The conduit termination assembly of claim 32 wherein said lip of said collar and said flange of said end fitting are tapered relative to each other.

34. The conduit termination assembly of claim 33 wherein said lip of said collar and said flange of said end fitting are tapered at the same angle relative to each other.

35. The conduit termination assembly of claim 32 wherein the end fitting further defines a hardware region.

* * * * *